US008780799B2

(12) United States Patent
Kotecha et al.

(10) Patent No.: US 8,780,799 B2
(45) Date of Patent: Jul. 15, 2014

(54) HANDLING MULTIPLE VOICE OVER INTERNET PROTOCOL (VOIP) CALLS VIA A SINGLE BEARER

(75) Inventors: Lalit R. Kotecha, San Ramon, CA (US); Kamlesh S. Kamdar, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 362 days.

(21) Appl. No.: 13/098,778

(22) Filed: May 2, 2011

(65) Prior Publication Data

US 2012/0281685 A1 Nov. 8, 2012

(51) Int. Cl.
*H04W 4/00* (2009.01)

(52) U.S. Cl.
USPC ........... 370/328; 370/329; 370/351; 370/401; 370/352; 370/218

(58) Field of Classification Search
USPC .............. 370/232, 235, 252, 230.1, 234, 236, 370/328
See application file for complete search history.

(56) References Cited

U.S. PATENT DOCUMENTS

| | | | | |
|---|---|---|---|---|
| 5,835,724 A * | 11/1998 | Smith | | 709/227 |
| 6,795,701 B1 * | 9/2004 | Baker et al. | | 455/411 |
| 7,046,702 B2 * | 5/2006 | Sagne | | 370/538 |
| 7,225,220 B2 * | 5/2007 | Gonzalez et al. | | 709/202 |
| 7,457,621 B2 * | 11/2008 | Zhang | | 455/435.2 |
| 7,633,909 B1 * | 12/2009 | Jones et al. | | 370/338 |
| 7,774,012 B2 * | 8/2010 | Chowdhury et al. | | 455/518 |
| 8,041,772 B2 * | 10/2011 | Amanuddin et al. | | 709/208 |
| 8,312,286 B2 * | 11/2012 | Harris | | 713/183 |
| 8,406,207 B2 * | 3/2013 | Rahman et al. | | 370/338 |
| 2002/0006793 A1 * | 1/2002 | Kun-Szabo et al. | | 455/426 |
| 2004/0122956 A1 * | 6/2004 | Myers et al. | | 709/228 |
| 2004/0190535 A1 * | 9/2004 | Albal et al. | | 370/401 |
| 2005/0064821 A1 * | 3/2005 | Hedberg et al. | | 455/67.11 |
| 2005/0164153 A1 * | 7/2005 | Beatty et al. | | 434/350 |
| 2005/0179607 A1 | 8/2005 | Gorsuch et al. | | |
| 2007/0173303 A1 | 7/2007 | Viorel et al. | | |
| 2009/0245108 A1 * | 10/2009 | Wu et al. | | 370/233 |
| 2009/0257378 A1 * | 10/2009 | Cuny et al. | | 370/328 |
| 2010/0103863 A1 * | 4/2010 | Ulupinar et al. | | 370/315 |
| 2010/0113023 A1 * | 5/2010 | Huang et al. | | 455/436 |
| 2010/0142373 A1 * | 6/2010 | Jin et al. | | 370/230 |
| 2010/0311321 A1 | 12/2010 | Norin | | |
| 2010/0313232 A1 | 12/2010 | Norin | | |
| 2011/0080870 A1 * | 4/2011 | Bhalla et al. | | 370/328 |
| 2011/0170411 A1 * | 7/2011 | Wang et al. | | 370/235 |
| 2012/0250509 A1 * | 10/2012 | Leung et al. | | 370/235 |

* cited by examiner

*Primary Examiner* — Ricky Ngo
*Assistant Examiner* — Dewanda Samuel

(57) ABSTRACT

A device receives a first request to establish a bearer with a first UE associated with a LTE device, where the first request includes first parameters associated with the first UE. The device also determines that the LTE device does not have the bearer established, and provides a new bearer request, with the first parameters, to a wireless network in order to establish the bearer with the LTE device at a first data rate. The device further receives a second request to establish another bearer with a second UE associated with the LTE device, where the second request includes second parameters associated with the second UE. The device determines that the LTE device has the bearer established, and provides a modify bearer request, with the second parameters, to the wireless network in order to modify the bearer with the LTE device to a second data rate.

20 Claims, 8 Drawing Sheets

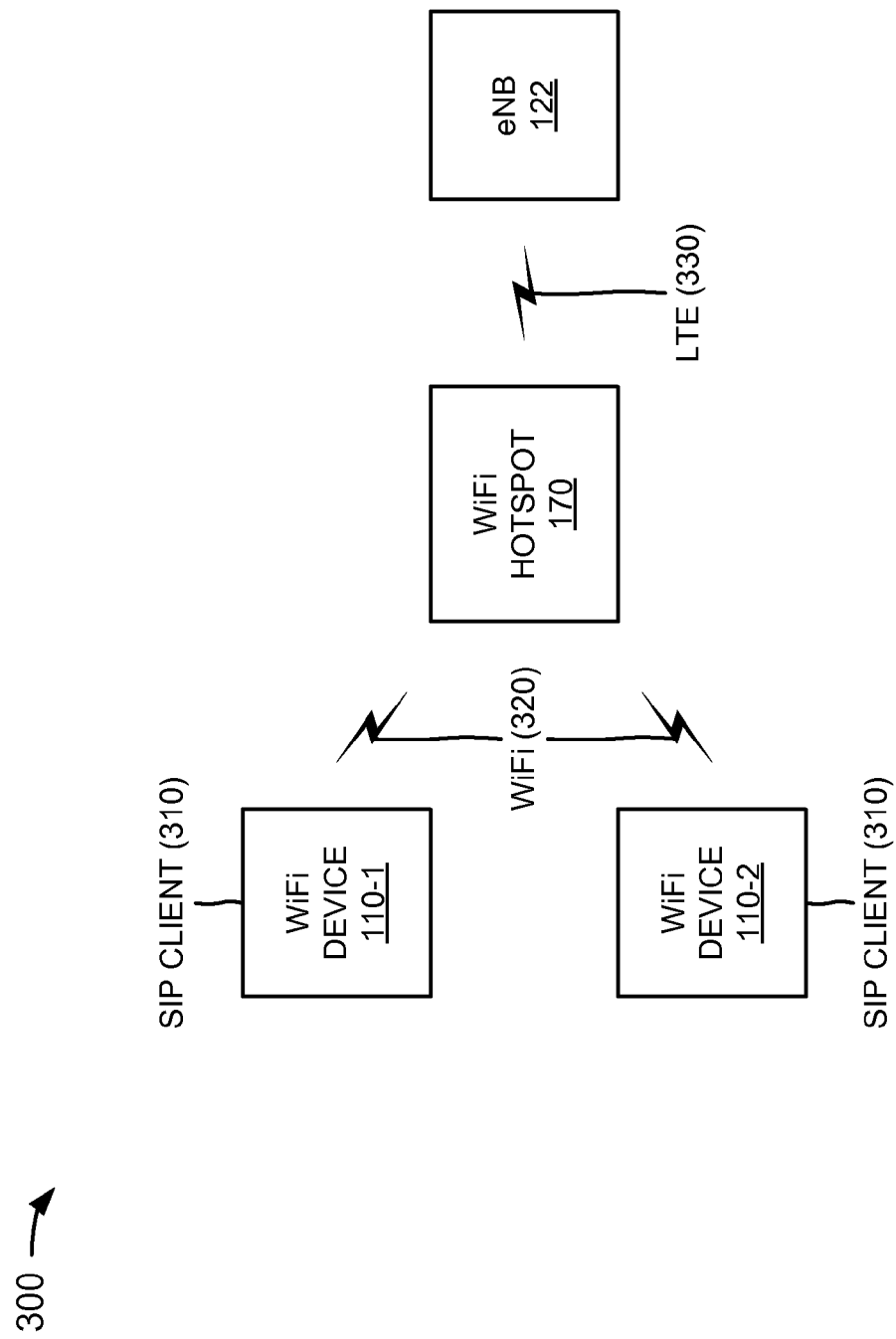

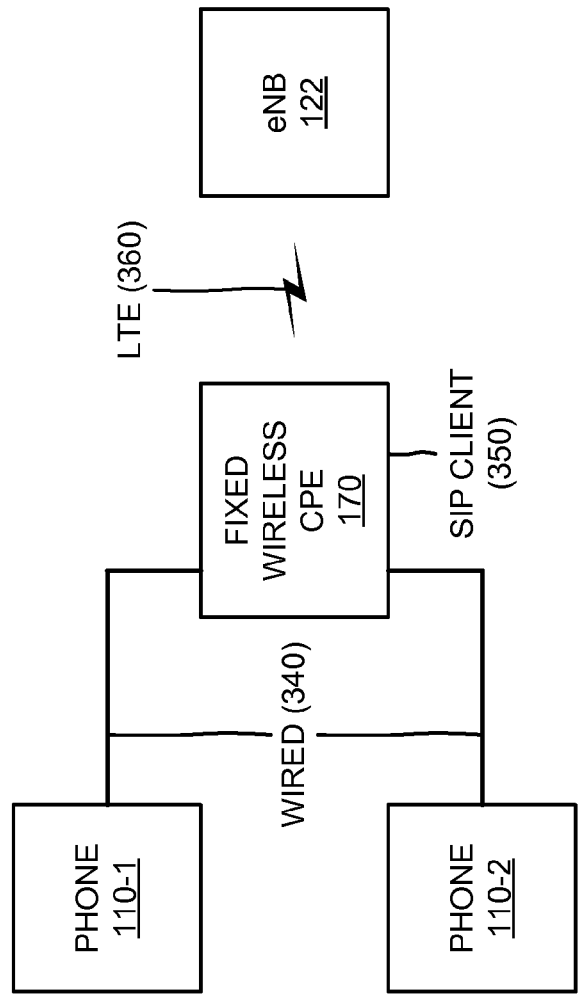

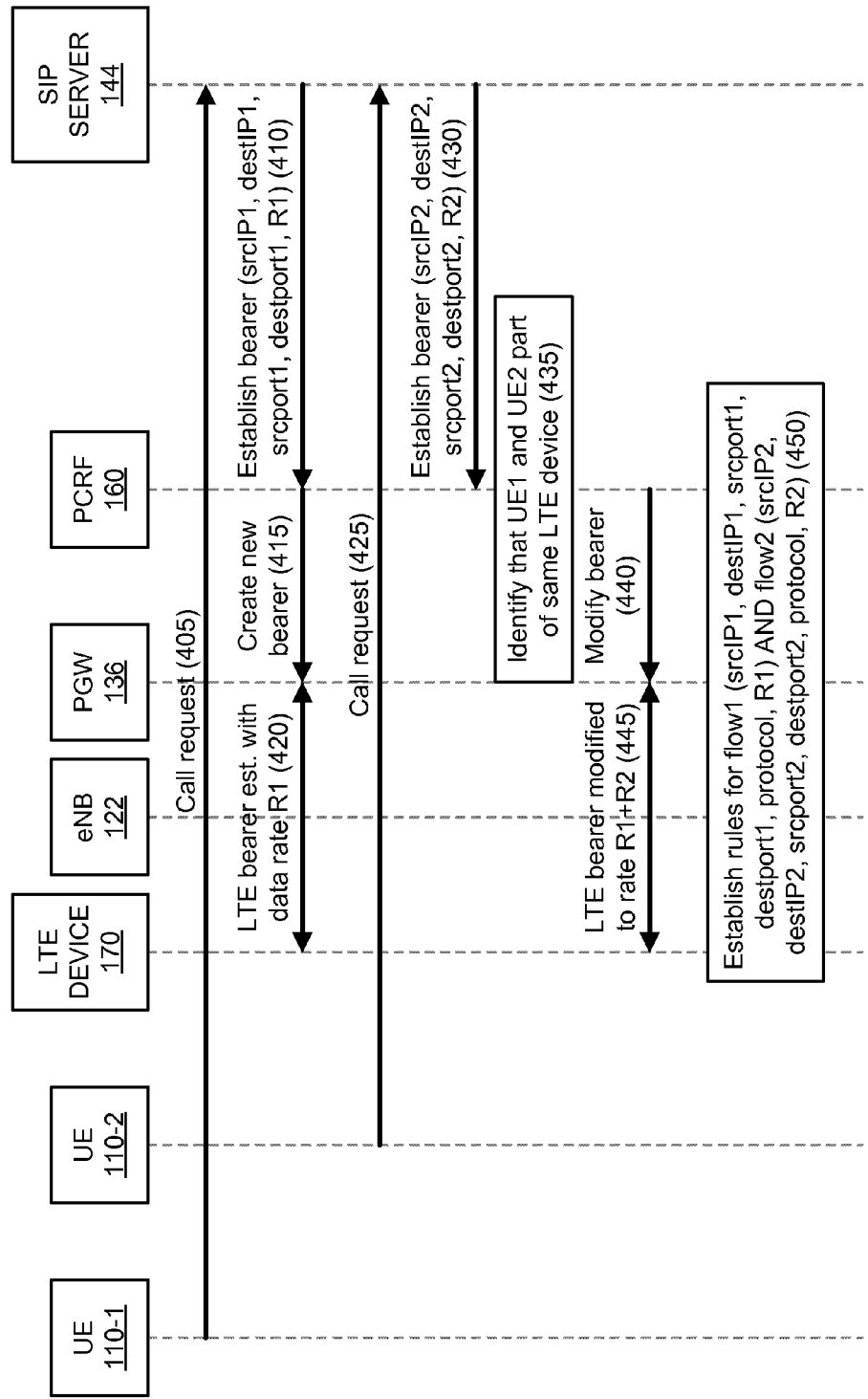

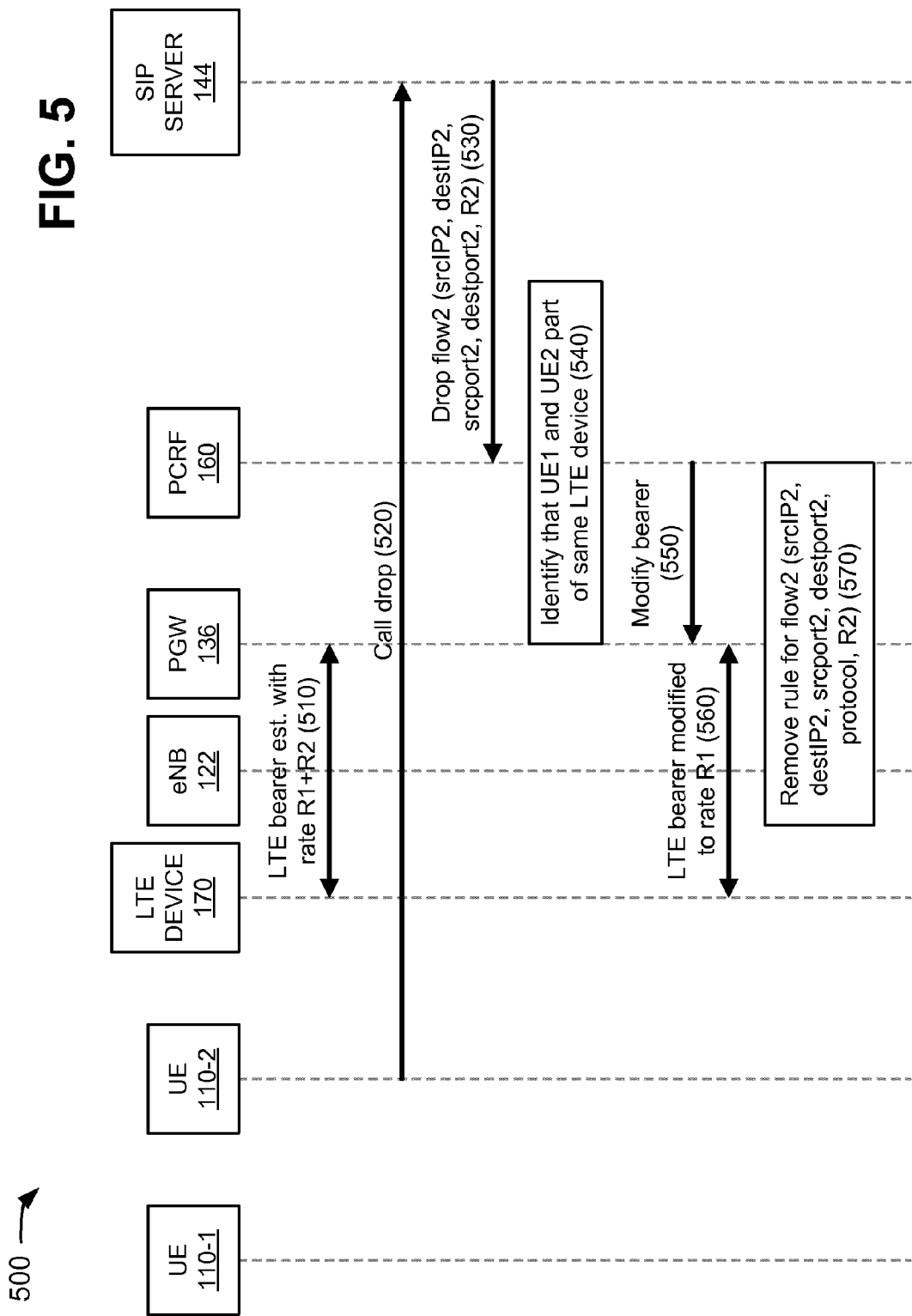

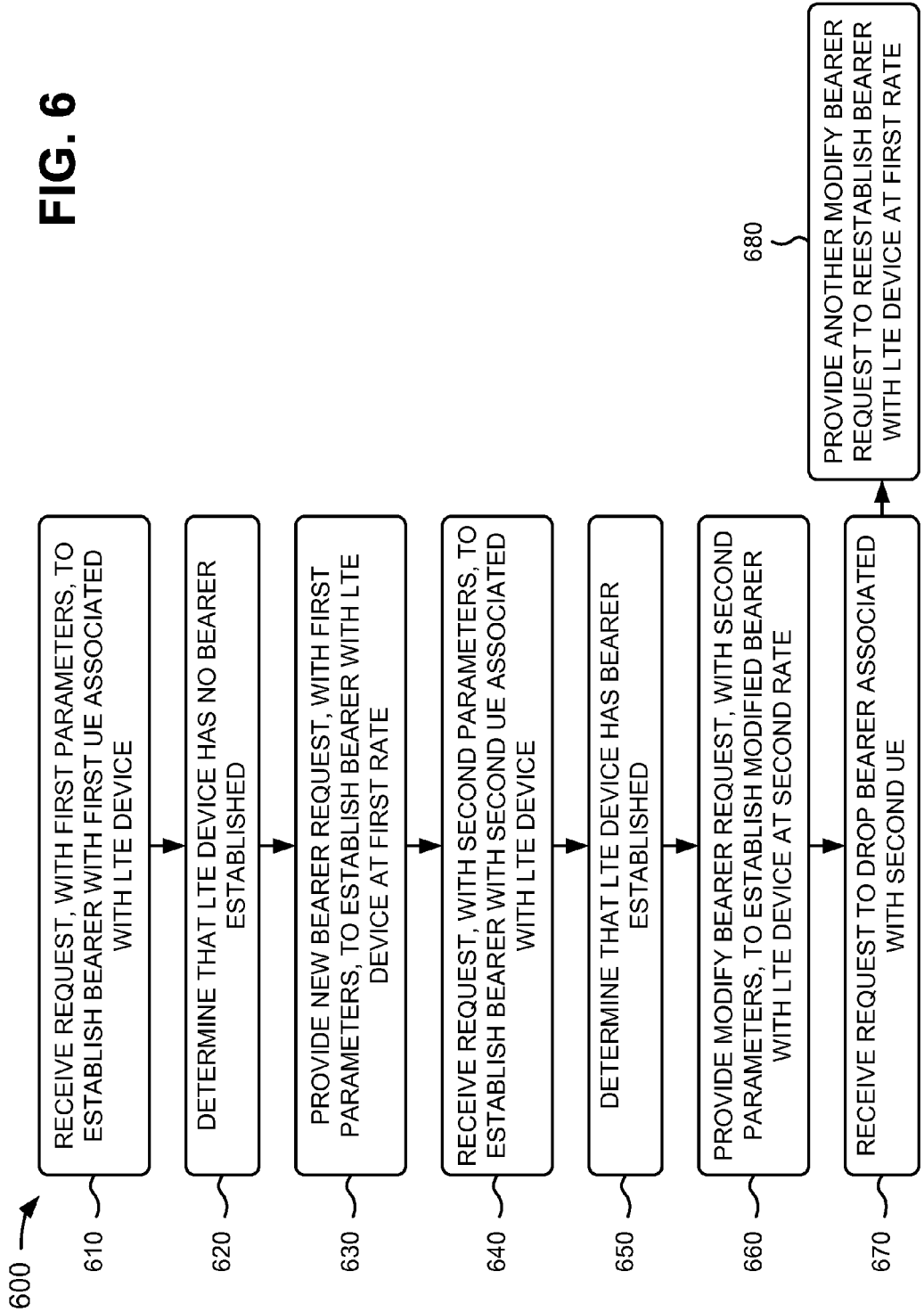

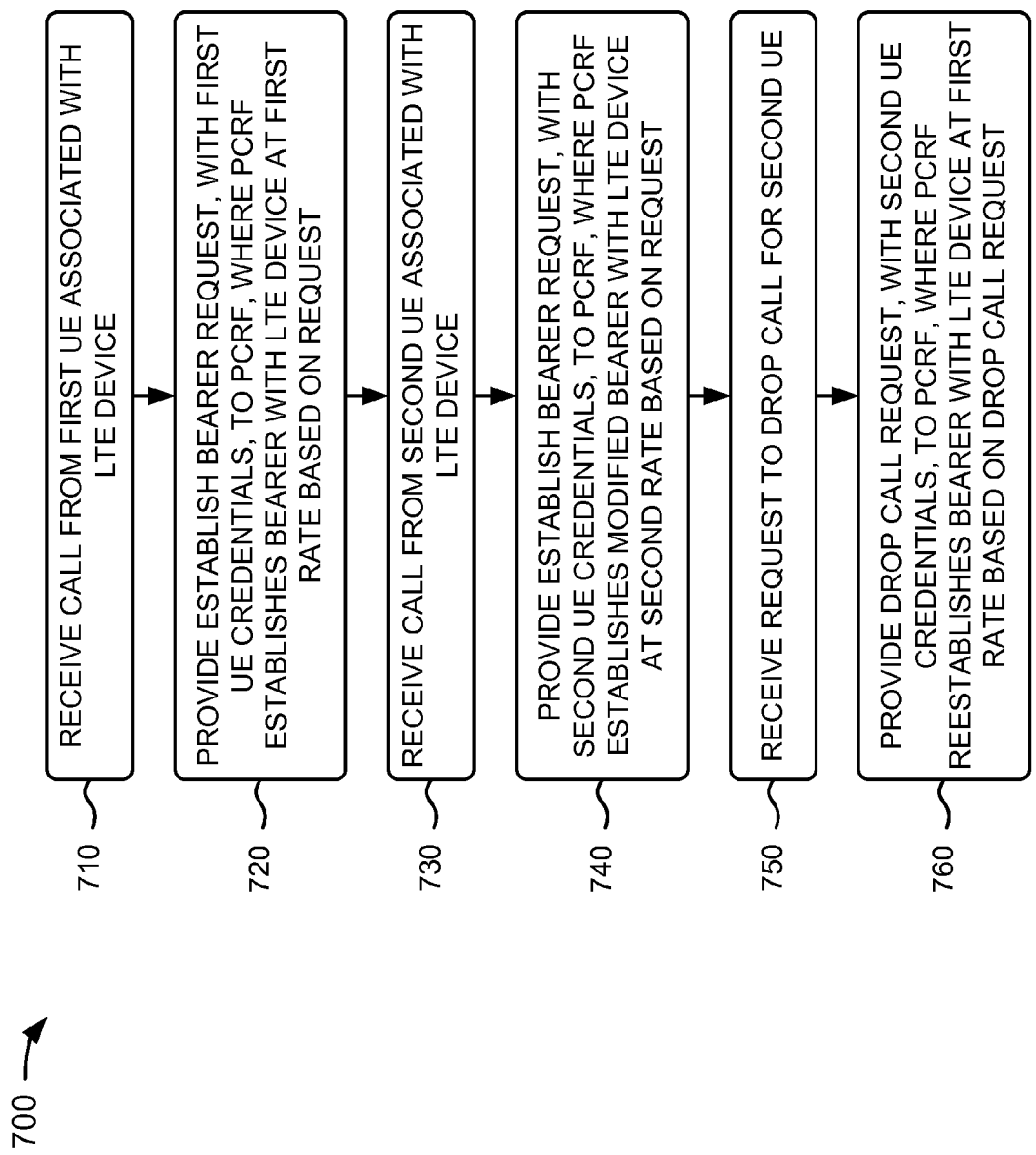

HANDLING MULTIPLE VOICE OVER INTERNET PROTOCOL (VOIP) CALLS VIA A SINGLE BEARER

BACKGROUND

As wireless network data rates improve using third generation (3G), fourth generation (4G), and WiFi technologies, more and more bandwidth-intensive applications are being developed. A 4G wireless network is an all Internet protocol (IP) wireless network in which different advanced multimedia application services (e.g., voice over IP (VoIP) content, video content, etc.) are delivered over IP. 4G wireless networks include a radio access network (e.g., a long term evolution (LTE) network or an enhanced high rate packet data (eHRPD) network) and a wireless core network (e.g., referred to as an evolved packet core (EPC) network). The LTE network is often called an evolved universal terrestrial radio access network (E-UTRAN). The EPC network is an all-Internet protocol (IP) packet-switched core network that supports high-speed wireless and wireline broadband access technologies. An evolved packet system (EPS) is defined to include the LTE (or eHRPD) network and the EPC network.

As data rates increase, 4G wireless networks are also being utilized in fixed wireless customer premises equipment (CPE) for homes and small offices. Advancements in smart phones allow them to act as WiFi hotspots that permit multiple WiFi-capable user equipment (UE) to use a 4G wireless network. A UE connected to a 4G wireless network may wish to place more than one VoIP call or more than one video telephony call. However, current 4G wireless networks are designed to handle only one VoIP or video telephony call per subscriber device (e.g., per UE). Furthermore, UEs connected to a fixed wireless CPE or to a WiFi hotpot may wish to simultaneously place a VoIP or video telephony call. However, current 4G wireless networks are designed to handle only one VoIP or video telephony call per fixed wireless CPE or per WiFi hotspot.

BRIEF DESCRIPTION OF THE DRAWINGS

FIGS. 3A and 3B are diagrams of example components of a portion of the network depicted in FIG. 1;

FIG. 4 is a flow diagram of example interactions between components of an example portion of the network in FIG. 1;

FIG. 5 is a flow diagram of example interactions between components of another example portion of the network in FIG. 1;

FIG. 6 is a flow chart of an example process for handling multiple VoIP calls over a single bearer according to an implementation described herein; and FIG. 7 is a flow chart of another example process for handling multiple VoIP calls over a single bearer according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable multiple VoIP calls, video telephony calls, or other IP-based calls to be handled over a single bearer of an IP wireless network, such as a LTE network. In one example implementation, the LTE network may include a device, such as a policy and charging rules function (PCRF), for establishing a bearer for UEs associated with the LTE network. The PCRF may receive a request, with first parameters, to establish a bearer with a first UE associated with a subscriber LTE device (e.g., a fixed wireless CPE, a WiFi hotspot, etc.), and may determine that the LTE device has no bearer established. The PCRF may provide a new bearer request, with the first parameters, to the LTE network in order to establish a bearer with the LTE device at a first data rate. The PCRF may receive a request, with second parameters, to establish a bearer with a second UE associated with the LTE device, and may determine that the LTE device has a bearer established. The PCRF may provide a modify bearer request, with the second parameters, to the LTE network in order to establish a modified bearer with the LTE device at a second data rate, where the second data rate includes a data rate for the first UE and another data rate for the second UE.

Such an arrangement may enable the LTE device to handle multiple VoIP or video telephony calls for UEs via a single bearer. In other implementations, the LTE device may correspond to a subscriber UE device and the systems and/or methods described herein may enable the LTE device to place multiple VoIP or video telephony calls via a single bearer of the LTE network.

As used herein, the terms "subscriber" and/or "user" may be used interchangeably. Also, the terms "subscriber" and/or "user" are intended to be broadly interpreted to include a UE or a LTE device, or a user of a UE or a LTE device.

Figure 1:
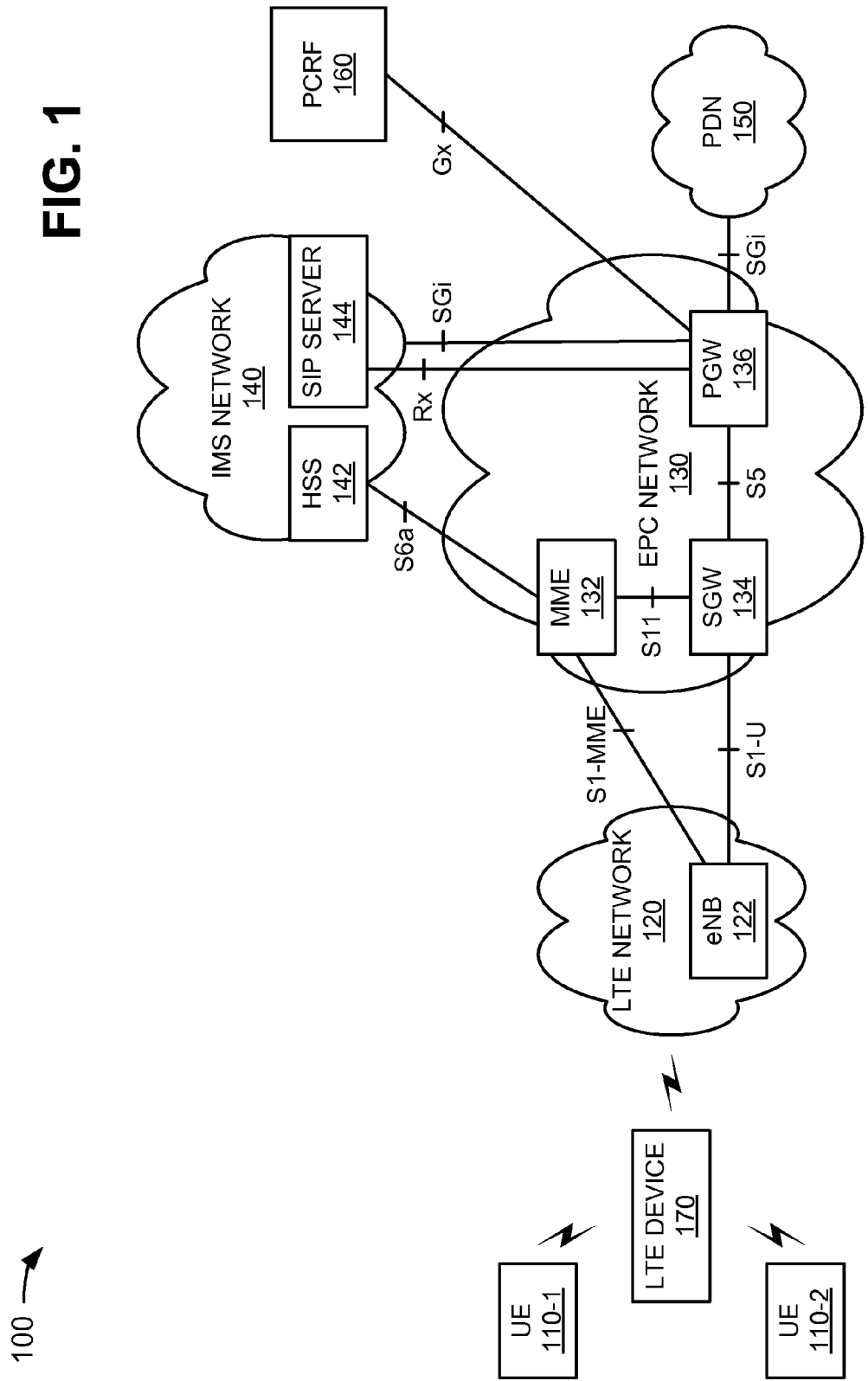
FIG. 1 is a diagram of an example network in which systems and/or methods described herein may be implemented.

FIG. 1 is a diagram of an example network 100 in which systems and/or methods described herein may be implemented. As illustrated, network 100 may include UEs 110-1 and 110-2 (collectively referred to herein as "UEs 110," and, in some instances singularly as "UE 110"), a LTE network 120, an EPC network 130, an IP multimedia subsystem (IMS) network 140, a packet data network (PDN) 150, a PCRF 160, and a LTE device 170. LTE network 120 may include an eNodeB (eNB) 122. EPC network 130 may include a mobility management entity (MME) 132, a serving gateway (SGW) 134, and a PDN gateway (PGW) 136. IMS network 140 may include a home subscriber server (HSS) 142 and a session initiation protocol (SIP) server 144. Devices and/or networks of network 100 may interconnect via wired and/or wireless connections.

Two UEs 110 and a single LTE network 120, eNB 122, EPC network 130, MME 132, SGW 134, PGW 136, IMS network 140, HSS 142, SIP server 144, PDN 150, PCRF 160, and LTE device 170 have been illustrated in FIG. 1 for simplicity. In practice, there may be more UEs 110, LTE networks 120, eNBs 122, EPC networks 130, MMEs 132, SGWs 134, PGWs 136, IMS networks 140, HSSs 142, SIP servers 144, PDNs 150, PCRFs 160, and/or LTE devices 170. As further shown in FIG. 1, eNB 122 may interface with MME 132 over a S1-MME interface, and may interface with SGW 134 over a S1-U interface. MME 132 may interface with SGW 134 over a S11 interface, and may interface with HSS 142 over a S6a interface. SGW 134 may interface with PGW 136 over a S5 interface. PGW 136 may interface with SIP server 144 over a Rx interface, may interface with IMS network 140 and PDN 150 over a SGi interface, and may interface with PCRF 160 over a Gx interface.

UE 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer (e.g., with a wireless air card), or other types of computation or communication devices. In one example, UE 110 may include a device that is capable of communicating over LTE network 120, EPC network 130, IMS network 140, and/or PDN 150.

In one example implementation, UE 110 may include a non-LTE capable device that connects to LTE network 120 via a WiFi access point (or hotspot), such as LTE device 170. The non-LTE capable device may execute a VoIP client, based on the SIP protocol, to place VoIP calls to LTE network 120. In another example implementation, UE 110 may include a non-LTE capable device that connects to LTE network 120 via a fixed wireless CPE, such as LTE device 170. In such an arrangement, LTE device 170 may execute a VoIP client that is based on the SIP protocol, and may provide an interface (e.g., a RJ-11 interface, an IP interface, a RJ-45 interface, a Multimedia over Coax Alliance (MoCA) over coaxial interface, etc.) that enables multiple non-LTE capable devices (e.g., traditional wire line telephones) to make VoIP calls to LTE network 120.

LTE network 120 may include a communications network that connects subscribers (e.g., UEs 110 and/or LTE device 170) to a service provider. In one example, LTE network 120 may include a WiFi network (e.g., using IEEE 802.11 standards) or other access networks (e.g., an E-UTRAN or an enhanced high-rate packet data (eHRPD) network). In another example, LTE network 120 may include a radio access network capable of supporting high data rate, low latency, packet optimization, large capacity and coverage, etc.

eNB 122 may include one or more computation and/or communication devices that receive voice and/or data from MME 132 and/or SGW 134 and wirelessly transmit that voice and/or data to LTE device 170. eNB 122 may also include one or more devices that wirelessly receive voice and/or data from UEs 110 (e.g., via LTE device 170) and transmit that voice and/or data to one of MME 132 and/or SGW 134 or to other UEs 110. eNB 122 may combine the functionalities of a base station and a radio network controller (RNC) in 2G or 3G radio access networks.

EPC network 130 may include a core network architecture of the Third Generation Partnership Project (3GPP) LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and/or communication devices that may be responsible for idle mode tracking and paging procedures (e.g., including retransmissions) for LTE device 170. MME 132 may be involved in a bearer activation/deactivation process (e.g., for LTE device 170) and may choose a SGW for LTE device 170 at an initial attach and at a time of intra-LTE handover. MME 132 may authenticate UEs 110 and/or LTE device 170 (e.g., via interaction with HSS 142). Non-access stratum (NAS) signaling may terminate at MME 132 and MME 132 may generate and allocate temporary identities to UEs 110 and/or LTE device 170. MME 132 may check authorization of LTE device 170 to camp on a service provider's Public Land Mobile Network (PLMN) and may enforce roaming restrictions for LTE device 170. MME 132 may be a termination point in EPC network 130 for ciphering/integrity protection for NAS signaling and may handle security key management. MME 132 may provide a control plane function for mobility between LTE and access networks.

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 134 may route and forward user data packets, may act as a mobility anchor for a user plane during inter-eNB handovers, and may act as an anchor for mobility between LTE and other 3GPP technologies. For an idle state LTE device 170, SGW 134 may terminate a downlink (DL) data path and may trigger paging when DL data arrives for LTE device 170. SGW 134 may manage and store contexts associated with LTE device 170 (e.g., parameters of an IP bearer service, network internal routing information, etc.).

PGW 136 may include one or more data transfer devices (or network devices), such as a gateway, a router, a switch, a firewall, a NIC, a hub, a bridge, a proxy server, an OADM, or some other type of device that processes and/or transfers data. In one example implementation, PGW 136 may provide connectivity of LTE device 170 to external PDNs (e.g., PDN 150) by being a traffic exit/entry point for LTE device 170. LTE device 170 may simultaneously connect to more than one PGW 136 for accessing multiple PDNs 150. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services.

HSS 142 may include one or more computation or communication devices that gather, process, search, and/or provide information in a manner described herein. In one example implementation, HSS 142 may include a master user database that supports devices of IMS network 140 that handle calls. HSS 142 may include subscription-related information (e.g., subscriber profiles), may perform authentication and authorization of a user, and may provide information about a subscriber's location and IP information.

SIP server 144 may include one or more computation or communication devices that gather, process, search, and/or provide information in a manner described herein. In one example implementation, SIP server 144 may include a device that facilitates the establishment of SIP-based calls, such as VoIP and video telephony calls. A SIP-based call, as the term is used herein, is to be broadly interpreted to include any out-of-dialog or dialog-establishing SIP method (e.g., a SIP INVITE request, a SIP SUBSCRIBE request, a SIP REFER request, a SIP OPTIONS request, a SIP MESSAGE request, a SIP REGISTER request, etc.). SIP server 144 may act as both a server and a client for the purpose of making requests on behalf of other clients. Requests may be serviced internally or by passing them on, possibly after translation, to other servers. SIP server 144 may interpret, and, if necessary, rewrite a request message before forwarding the request message.

In one example implementation, SIP server 144 may receive a call request from UE 110-1, and may provide an establish bearer request, with credentials associated with UE 110-1, to PCRF 160. PCRF 160 may establish a bearer with LTE device 170 (e.g., for the call provided by UE 110-1) at a first data rate and based on the request. SIP server 144 may receive a call request from UE 110-2, and may provide another establish bearer request, with credentials associated with UE 110-2, to PCRF 160. PCRF 160 may establish a modified bearer with LTE device 170 (e.g., to accommodate the call provided by UE 110-2) at a second data rate. The second data rate may include a data rate for UE 110-1 and another data rate for UE 110-2. At a later time, SIP server 144 may receive, from UE 110-2, a request to drop the call with UE 110-2, and may provide a drop call request, with the credentials of UE 110-2, to PCRF 160. PCRF 160 may reestablish the bearer with LTE device 170 at the first data rate based on the drop call request. SIP server 144 is discussed in more detail below in connection with, for example, FIGS. 4 and 5.

PDN 150 may include one or more networks, such as a local area network (LAN), a wide area network (WAN), a metropolitan area network (MAN), a telephone network, the Internet, etc., capable of communicating with LTE device 170. In one example PDN 150 may include a network that breaks up a message (e.g., information) into packets for transmission. Unlike a circuit switching network, which requires establishment of a dedicated point-to-point connection, each packet in PDN 150 may include a destination address. Thus, all packets in a single message may not travel the same path. As traffic conditions change in PDN 150, the packets may be dynamically routed via different paths in PDN 150, and the packets may even arrive out of order. A destination device in PDN 150 may reassemble the packets into their proper sequence.

PCRF 160 may include one or more server devices, or other types of computation or communication devices, that gather, process, and/or provide information in a manner described herein. For example, PCRF 160 may include a device that provides policy control decision and flow based charging control functionalities. PCRF 160 may provide network control regarding service data flow detection, gating, quality of service (QoS) and flow based charging, etc. PCRF 160 may determine how a certain service data flow shall be treated, and may ensure that user plane traffic mapping and treatment is in accordance with a user's subscription profile.

In one example implementation, PCRF 160 may receive a request, with first parameters associated with UE 110-1, to establish a bearer with UE 110-1, and may determine that LTE device 170 has no bearer established. PCRF 160 may provide a new bearer request, with the first parameters, to eNB 122, MME 132, SGW 134, PGW 136, and LTE device 170 in order to establish a bearer with LTE device 170 at a first data rate. PCRF 160 may receive a request, with second parameters associated with UE 110-2, to establish a bearer with UE 110-2, and may determine that LTE device 170 already has a bearer established. PCRF 160 may provide a modify bearer request, with the second parameters, to eNB 122, MME 132, SGW 134, PGW 136, and LTE device 170 in order to establish a modified bearer with LTE device 170 at a second data rate. The second data rate may include a data rate for UE 110-1 and another data rate for UE 110-2. At a later time, PCRF 160 may receive, from UE 110-2, a request to drop a call associated with UE 110-2. PCRF 160 may provide another modify bearer request to eNB 122, MME 132, SGW 134, PGW 136, and LTE device 170 in order to reestablish the bearer with LTE device 170 at the first data rate. PCRF 160 is discussed in more detail below in connection with, for example, FIGS. 4 and 5.

LTE device 170 may include one or more computation or communication devices that gather, process, search, and/or provide information in a manner described herein. In one example implementation, LTE device 170 may include a WiFi access point (or hotspot) that permits multiple non-LTE capable WiFi devices (e.g., UEs 110) to use LTE services provided by LTE network 120. In another implementation, LTE device 170 may include a fixed wireless CPE, such as an outdoor broadband unit that provides a convergence point between wireless protocols (e.g., associated with eNB 122) and IP protocols. The fixed wireless CPE may be physically deployed with a satellite antenna (e.g., on a roof or a side wall of a house associated with a customer premises). The fixed wireless CPE may execute a VoIP client that is based on the SIP protocol, and may provide an interface (e.g., a RJ-11 interface) that enables multiple non-LTE capable devices (e.g., traditional wire line telephones) to make VoIP calls to LTE network 120.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
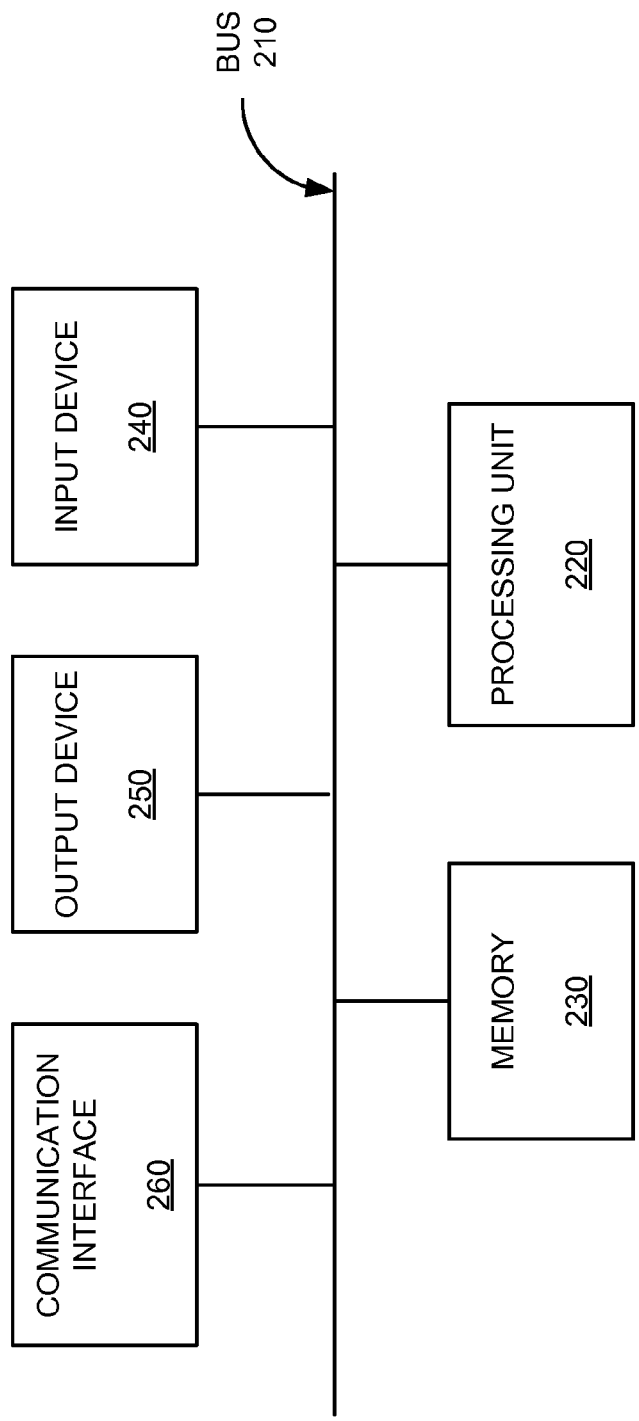
FIG. 2 is a diagram of example components of a device that may correspond to one of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIGS. 3A and 3B are diagrams of example components of a portion 300 of network 100. As shown in FIGS. 3A and 3B, network portion 300 may include UEs 110-1 and 110-2, eNB 122, and LTE device 170. UEs 110-1 and 110-2, eNB 122, and LTE device 170 may include the features described above in connection with, for example, one or more of FIGS. 1 and 2.

As further shown in FIG. 3A, UEs 110-1 and 110-2 may correspond to WiFi devices 110-1 and 110-2, respectively. WiFi devices 110-1 and 110-2 may include non-LTE capable devices that may execute a SIP client 310, such as a VoIP client, to place VoIP calls to LTE network 120 (e.g., via eNB 122 and LTE device 170). WiFi devices 110-1 and 110-2 may wirelessly connect to a WiFi access point or hotspot, such as LTE device 170, as indicated by reference number 320. WiFi hotspot 170 may wirelessly connect to eNB 122 so that WiFi hotspot 170 may provide LTE services 330, such as VoIP or video telephony services, to WiFi devices 110-1 and 110-2. In one example implementation, WiFi devices 110-1 and 110-2 may be provisioned or registered in PCRF 160.

As further shown in FIG. 3B, UEs 110-1 and 110-2 may correspond to traditional devices, such as traditional phones 110-1 and 110-2, respectively. Traditional phones 110-1 and 110-2 may connect, via wired connections 340, to a fixed wireless CPE, such as LTE device 170. Fixed wireless CPE 170 may include an interface (e.g., a RJ-11 interface) to receive wired connections 340 from traditional phones 110-1 and 110-2, and may include a SIP client 350 that enables traditional phones 110-1 and 110-2 to place VoIP or video telephone calls. Fixed wireless CPE 170 may wirelessly connect to eNB 122 so that fixed wireless CPE 170 may provide LTE services 360, such as VoIP or video telephony services, to traditional phones 110-1 and 110-2. In one example implementation, traditional phones 110-1 and 110-2 may be provisioned or registered in PCRF 160.

In another example, wired connections 340 may connect to an IP interface, such as a local area network (LAN) (e.g., RJ-45) or a MoCA coaxial interface, provided in fixed wireless CPE 170. In such an arrangement, SIP client 350 may implemented in UEs 110-1 and 110-2 as described above in connection with FIG. 3A.

Although FIGS. 3A and 3B show example components of network portion 300, in other implementations, network portion 300 may include fewer components, different components, differently arranged components, or additional components than depicted in FIGS. 3A and 3B. Additionally, or alternatively, one or more components of network portion 300 may perform one or more other tasks described as being performed by one or more other components of network portion 300.

FIG. 4 is a flow diagram of example interactions between components of an example portion 400 of network 100. As illustrated, example network portion 400 may include UEs 110-1 and 110-2, eNB 122, PGW 136, SIP server 144, PCRF 160, and LTE device 170. UEs 110-1 and 110-2, eNB 122, PGW 136, SIP server 144, PCRF 160, and LTE device 170 may include the features described above in connection with, for example, one or more of FIGS. 1-3. UEs 110-1 and 110-2 may be associated with LTE device 170 and may be provisioned in PCRF 160.

As further shown in FIG. 4, UE 110-1 may make a call request 405 to SIP server 144 via a SIP INVITE message or a similar call setup message. Call request 405 may include a request for a VoIP call, a video telephony call, or another type of multimedia call. SIP server 144 may receive call request 405, and may provide, to PCRF 160, a request 410 to establish a bearer for call request 405. Request 410 may include credentials or parameters associated with UE 110-1. The credentials associated with UE 110-1 may include, for example, a source IP address associated with UE 110-1 (e.g., srcIP1), a destination IP address provided in call request 405 (e.g., destIP1), a source port associated with UE 110-1 (e.g., srcport1), a destination port provided in call request 405 (e.g., destport1), a protocol for the bearer, and a data rate (e.g., R1) for the bearer.

PCRF 160 may receive request 410, and may determine that UE 110-1 (e.g., associated with LTE device 170) does not have a bearer established. PCRF 160 may provide, to PGW 136, a request 415 to create a new bearer for UE 110-1. Request 415 may include the credentials, associated with UE 110-1, provided in request 410. eNB 122, MME 132 (not shown in FIG. 4), SGW 134 (not shown in FIG. 4), and/or PGW 136 may establish a LTE bearer with LTE device 170 at a particular data rate (e.g., R1), as indicated by reference number 420. PGW 136 may establish a rule for a flow, for call request 405, with the credentials provided in request 410, and may limit data rates for the call to the particular data rate (e.g., R1). eNB 122 may allocate a bandwidth of the particular data rate (e.g., R1) to the LTE bearer established for call request 405.

While the call made by UE 110-1, via call request 405, is ongoing, UE 110-2 may make a call request 425 to SIP server 144 via a SIP INVITE message or a similar call setup message. Call request 425 may include a request for a VoIP call, a video telephony call, or another type of multimedia call. SIP server 144 may receive call request 425, and may provide, to PCRF 160, a request 430 to establish a bearer for call request 425. Request 430 may include credentials or parameters associated with UE 110-2. The credentials associated with UE 110-2 may include, for example, a source IP address associated with UE 110-2 (e.g., srcIP2), a destination IP address provided in call request 425 (e.g., destIP2), a source port associated with UE 110-2 (e.g., srcport2), a destination port provided in call request 425 (e.g., destport2), a protocol for the bearer, and a data rate (e.g., R2) for the bearer.

PCRF 160 may receive request 430, and may determine that LTE device 170 already has a bearer established (e.g., for the call associated with call request 405). In one example, PCRF 160 may determine that LTE device 170 has a bearer established by identifying that UEs 110-1 and 110-2 are connected to the same LTE device 170, as indicated by reference number 435. Since LTE device 170 already has a bearer established, PCRF 160 may provide, to PGW 136, a request 440 to modify the existing bearer. Request 440 may include the credentials, associated with UE 110-2, provided in request 430. eNB 122, MME 132 (not shown in FIG. 4), SGW 134 (not shown in FIG. 4), and/or PGW 136 may modify the existing LTE bearer with LTE device 170 to a particular data rate (e.g., R1+R2), as indicated by reference number 445. PGW 136 may establish a rule for a first flow (e.g., flow1), for call request 405, with the credentials provided in request 410, and may establish a rule for a second flow (e.g., flow2), for call request 425, with the credentials provided in request 430, as indicated by reference number 450. Although both calls may be utilizing a single bearer, PGW 136 may treat the calls separately as two flows (e.g., flow1 and flow2) so that one UE 110 is not over utilizing the bandwidth of the other UE 110. eNB 122 may allocate a bandwidth of the particular data rate (e.g., R1+R2) to the LTE bearer established for call requests 405 and 425.

Although FIG. 4 depicts handling of two IP-based calls (e.g., VoIP calls) via a single bearer, in one implementation, network portion 400 may be able to handle more than two IP-based calls via a single bearer. Furthermore, in other implementations, network portion 400 may enable a single UE (e.g., UE 110-1 or UE 110-2) to place multiple IP-based calls via a single bearer.

Although FIG. 4 shows example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

FIG. 5 is a flow diagram of example interactions between components of another example portion 500 of network 100. As illustrated, example network portion 500 may include UEs 110-1 and 110-2, eNB 122, PGW 136, SIP server 144, PCRF 160, and LTE device 170. UEs 110-1 and 110-2, eNB 122, PGW 136, SIP server 144, PCRF 160, and LTE device 170 may include the features described above in connection with, for example, one or more of FIGS. 1-4. UEs 110-1 and 110-2 may be associated with LTE device 170 and may be provisioned in PCRF 160.

It may be assumed for FIG. 5, that UEs 110-1 and 110-2 have ongoing calls established via a single LTE bearer. It may further be assumed that eNB 122, MME 132 (not shown in FIG. 5), SGW 134 (not shown in FIG. 5), and/or PGW 136 have established the single LTE bearer with LTE device 170 at a particular data rate (e.g., R1+R2), as indicated by reference number 510. eNB 122 may allocate a bandwidth of the particular data rate (e.g., R1+R2) to the LTE bearer established for the two ongoing calls.

While the calls are still ongoing, UE 110-2 may provide a call drop request 520 to SIP server 144 via a SIP message or a similar call drop message. Call drop request 520 may include a request to drop a VoIP call, a video telephony call, or another type of multimedia call. SIP server 144 may receive call drop request 520, and may provide, to PCRF 160, a request 530 to drop a flow (e.g., flow2) for the call with UE 110-2. Request 530 may include credentials or parameters associated with UE 110-2. The credentials associated with UE 110-2 may include, for example, a source IP address associated with UE 110-2 (e.g., srcIP2), a destination IP address provided in call request 425 (e.g., destIP2), a source port associated with UE 110-2 (e.g., srcport2), a destination port provided in call request 425 (e.g., destport2), a protocol for the bearer, and a data rate (e.g., R2) for the bearer.

PCRF 160 may receive request 530, and may determine that LTE device 170 already has a bearer established (e.g., for the calls associated with UEs 110-1 and 110-2). In one example, PCRF 160 may determine that LTE device 170 has a bearer established by identifying that UEs 110-1 and 110-2 are connected to the same LTE device 170, as indicated by reference number 540. Since LTE device 170 already has a bearer established, PCRF 160 may provide, to PGW 136, a request 550 to modify the existing bearer. Request 550 may include the credentials, associated with UE 110-2, provided in request 530. eNB 122, MME 132 (not shown in FIG. 5), SGW 134 (not shown in FIG. 5), and/or PGW 136 may modify the existing LTE bearer with LTE device 170 to a particular data rate (e.g., R1), as indicated by reference number 560. PGW 136 may remove the rule for the second flow (e.g., flow2), for the call associated with UE 110-2, as indicated by reference number 570. eNB 122 may allocate a bandwidth of the particular data rate (e.g., R1) to the LTE bearer established for the ongoing call associated with UE 110-1.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

FIG. 6 is a flow chart of an example process 600 for handling multiple VoIP calls over a single bearer according to an implementation described herein. In one implementation, process 600 may be performed by PCRF 160. In another implementation, some or all of process 600 may be performed by another device or group of devices, including or excluding PCRF 160.

As shown in FIG. 6, process 600 may include receiving a request, with first parameters, to establish a bearer with a first UE associated with a LTE device (block 610), and determining that the LTE device has no bearer established (block 620). For example, in implementations described above in connection with FIG. 4, UE 110-1 may make call request 405 to SIP server 144 via a SIP INVITE message or a similar call setup message. SIP server 144 may receive call request 405, and may provide, to PCRF 160, request 410 to establish a bearer for call request 405. Request 410 may include credentials or parameters associated with UE 110-1. The credentials associated with UE 110-1 may include, for example, a source IP address associated with UE 110-1 (e.g., srcIP1), a destination IP address provided in call request 405 (e.g., destIP1), a source port associated with UE 110-1 (e.g., srcport1), a destination port provided in call request 405 (e.g., destport1), a protocol for the bearer, and a data rate (e.g., R1) for the bearer. PCRF 160 may receive request 410, and may determine that UE 110-1 (e.g., associated with LTE device 170) does not have a bearer established.

As further shown in FIG. 6, process 600 may include providing a new bearer request, with the first parameters, to establish a bearer with the LTE device at a first rate (block 630). For example, in implementations described above in connection with FIG. 4, PCRF 160 may provide, to PGW 136, request 415 to create a new bearer for UE 110-1. Request 415 may include the credentials, associated with UE 110-1, provided in request 410. eNB 122, MME 132, SGW 134, and/or PGW 136 may establish a LTE bearer with LTE device 170 at a particular data rate (e.g., R1), as indicated by reference number 420.

Returning to FIG. 6, process 600 may include receiving a request, with second parameters, to establish a bearer with a second UE associated with the LTE device (block 640), and determining that the LTE device has a bearer established (block 650). For example, in implementations described above in connection with FIG. 4, while the call made by UE 110-1, via call request 405, is ongoing, UE 110-2 may make call request 425 to SIP server 144. SIP server 144 may receive call request 425, and may provide, to PCRF 160, request 430 to establish a bearer for call request 425. Request 430 may include credentials or parameters associated with UE 110-2.

The credentials associated with UE 110-2 may include, for example, a source IP address associated with UE 110-2 (e.g., srcIP2), a destination IP address provided in call request 425 (e.g., destIP2), a source port associated with UE 110-2 (e.g., srcport2), a destination port provided in call request 425 (e.g., destport2), a protocol for the bearer, and a data rate (e.g., R2) for the bearer. PCRF 160 may receive request 430, and may determine that LTE device 170 already has a bearer established (e.g., for the call associated with call request 405).

As further shown in FIG. 6, process 600 may include providing a modify bearer request, with the second parameters, to establish a modified bearer with the LTE device at a second rate (block 660). For example, in implementations described above in connection with FIG. 4, PCRF 160 may provide, to PGW 136, request 440 to modify the existing bearer. Request 440 may include the credentials, associated with UE 110-2, provided in request 430. eNB 122, MME 132, SGW 134, and/or PGW 136 may modify the existing LTE bearer with LTE device 170 to a particular data rate (e.g., R1+R2), as indicated by reference number 445.

Returning to FIG. 6, process 600 may include receiving a request to drop a bearer associated with the second UE (block 670), and providing another modify bearer request to reestablish the bearer with the LTE device at the first rate (block 680). For example, in implementations described above in connection with FIG. 5, while the calls are still ongoing, UE 110-2 may provide call drop request 520 to SIP server 144 via a SIP message or a similar call drop message. SIP server 144 may receive call drop request 520, and may provide, to PCRF 160, request 530 to drop a flow (e.g., flow2) for the call with UE 110-2. Request 530 may include credentials or parameters associated with UE 110-2. PCRF 160 may receive request 530, and may provide, to PGW 136, request 550 to modify the existing bearer. Request 550 may include the credentials, associated with UE 110-2, provided in request 530. eNB 122, MME 132, SGW 134, and/or PGW 136 may modify the existing LTE bearer with LTE device 170 to a particular data rate (e.g., R1), as indicated by reference number 560.

FIG. 7 is a flow chart of another example process 700 for handling multiple VoIP calls over a single bearer according to an implementation described herein. In one implementation, process 700 may be performed by SIP server 144. In another implementation, some or all of process 700 may be performed by another device or group of devices, including or excluding SIP server 144.

As shown in FIG. 7, process 700 may include receiving a call from a first UE associated with a LTE device (block 710), and providing an establish bearer request, with the first UE credentials, to a PCRF, where the PCRF establishes a bearer with the LTE device at a first rate based on the request (block 720). For example, in implementations described above in connection with FIG. 4, UE 110-1 may make call request 405 to SIP server 144 via a SIP INVITE message or a similar call setup message. Call request 405 may include a request for a VoIP call, a video telephony call, or another type of multimedia call. SIP server 144 may receive call request 405, and may provide, to PCRF 160, request 410 to establish a bearer for call request 405. Request 410 may include credentials or parameters associated with UE 110-1. PCRF 160 may receive request 410, and may provide, to PGW 136, request 415 to create a new bearer for UE 110-1. eNB 122, MME 132, SGW 134, and/or PGW 136 may establish a LTE bearer with LTE device 170 at a particular data rate (e.g., R1), as indicated by reference number 420.

As further shown in FIG. 7, process 700 may include receiving a call from a second UE associated with the LTE device (block 730), and providing an establish bearer request, with the second UE credentials, to the PCRF, where the PCRF establishes a modified bearer with the LTE device at a second rate based on the request (block 740). For example, in implementations described above in connection with FIG. 4, while the call made by UE 110-1, via call request 405, is ongoing, UE 110-2 may make call request 425 to SIP server 144 via a SIP INVITE message or a similar call setup message. SIP server 144 may receive call request 425, and may provide, to PCRF 160, request 430 to establish a bearer for call request 425. Request 430 may include credentials or parameters associated with UE 110-2. PCRF 160 may receive request 430, and may provide, to PGW 136, request 440 to modify the existing bearer. eNB 122, MME 132, SGW 134, and/or PGW 136 may modify the existing LTE bearer with LTE device 170 to a particular data rate (e.g., R1+R2), as indicated by reference number 445.

Returning to FIG. 7, process 700 may include receiving a request to drop the call for the second UE (block 750), and providing a drop call request, with the second UE credentials, to the PCRF, where the PCRF reestablishes the bearer with the LTE device at the first rate based on the drop call request (block 760). For example, in implementations described above in connection with FIG. 5, while the calls are still ongoing, UE 110-2 may provide call drop request 520 to SIP server 144 via a SIP message or a similar call drop message. SIP server 144 may receive call drop request 520, and may provide, to PCRF 160, request 530 to drop a flow (e.g., flow2) for the call with UE 110-2. Request 530 may include credentials or parameters associated with UE 110-2. PCRF 160 may receive request 530, and may provide, to PGW 136, request 550 to modify the existing bearer. eNB 122, MME 132, SGW 134, and/or PGW 136 may modify the existing LTE bearer with LTE device 170 to a particular data rate (e.g., R1), as indicated by reference number 560.

Systems and/or methods described herein may enable multiple VoIP calls, video telephony calls, or other IP-based calls to be handled over a single bearer of an IP wireless network, such as a LTE network.

Furthermore, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, a first request to establish a single bearer with a first user equipment associated with a long term evolution user (LTE) device, wherein the LTE device is a fixed wireless customer premises equipment (CPE) configured to provide access to an LTE network for a plurality of user equipment and the first request includes first parameters associated with the first user equipment;
   determining, by the computing device, that the LTE device does not have the single bearer established;
   providing, by the computing device, a new bearer request, with the first parameters, to a wireless network in order to establish the single bearer with the LTE device at a first data rate;
   receiving, by a computing device, a second request to establish another bearer with a second user equipment associated with the LTE device, where the second request includes second parameters associated with the second user equipment;
   determining, by the computing device, that the LTE device has the single bearer established for the first user equipment; and
   providing, by the computing device, a modify bearer request, with the second parameters, to the wireless network in order to modify the single bearer with the LTE device to a second data rate.

2. The method of claim 1, where the second data rate includes a data rate for the use by the first user equipment and another data rate for use by the second user equipment.

3. The method of claim 1, where the first user equipment conducts a first call via the modified single bearer while the second user equipment conducts a second call via the modified single bearer.

4. The method of claim 3, further comprising:
   receiving a request to drop one of the first call or the second call; and
   providing, based on the request to drop one of the first call or the second call, another modify bearer request to the wireless network in order reestablish the single bearer with the LTE device at the first data rate.

5. The method of claim 1, where determining that the LTE device has the single bearer established comprises:
   identifying that the first user equipment and the second user equipment are associated with the same LTE device.

6. The method of claim 1, wherein the LTE device is configured to enable multiple non-LTE capable devices to make voice over Internet protocol (VoIP) calls via the LTE network.

7. The method of claim 6, wherein:
   the first user equipment and the second user equipment comprise one of wire line telephones or Internet protocol (IP)-based devices.

8. A device, comprising:
   a processor to:
   receive a first request to establish a single bearer with a first user equipment associated with a long term evolution (LTE) device, wherein the LTE device is one of a WiFi access point or a fixed wireless customer premises equipment (CPE) and the first request includes first parameters associated with the first user equipment,
   determine that the LTE device does not have the single bearer established in a wireless network,
   provide a new bearer request, with the first parameters, to the wireless network in order to establish the single bearer with the LTE device at a first data rate,
   receive a second request to establish another bearer with a second user equipment associated with the LTE device, where the second request includes second parameters associated with the second user equipment,
   determine that the LTE device has the single bearer established in the wireless network, and
   provide a modify bearer request, with the second parameters, to the wireless network in order to modify the single bearer with the LTE device to a second data rate, where the second data rate includes a data rate for the use by the first user equipment and another data rate for use by the second user equipment.

9. The device of claim 8, where the first user equipment conducts a first call via the modified single bearer while the second user equipment conducts a second call via the modified single bearer.

10. The device of claim 9, where the processor is further to:
    receive a request to drop one of the first call or the second call; and
    provide, based on the request to drop one of the first call or the second call, another modify bearer request to the wireless network in order reestablish the single bearer with the LTE device at the first data rate.

11. The device of claim 8, where, when determining that the LTE device has the single bearer established in the wireless network, the processor is further to:
    identify that the first user equipment and the second user equipment are associated with the same LTE device.

12. The device of claim 8, wherein the LTE device comprises the WiFi access point and the first user equipment and the second user equipment comprise WiFi devices.

13. The device of claim 8, wherein the LTE device comprises the fixed wireless CPE and the first user equipment and the second user equipment comprise one of wire line telephones or Internet protocol (IP)-based devices.

14. A method, comprising:
    receiving, by a computing device, a first call request from a first user equipment associated with a long term evolution (LTE) device, wherein the LTE device is one of a WiFi access point or a fixed wireless customer premises equipment (CPE);
    providing, by the computing device, a first establish bearer request to a network device associated with a wireless network,
      where the first establish bearer request includes first credentials associated with the first user equipment, and
      where the network device establishes, based on the first establish bearer request, a single bearer with the LTE device at a first data rate;
    receiving, by a computing device, a second call request from a second user equipment associated with the LTE device; and providing, by the computing device, a second establish bearer request to the network device,
  where the second establish bearer request includes second credentials associated with the second user equipment, and
  where the network device modifies, based on the second establish bearer request, the single bearer with the LTE device to a second data rate.

15. The method of claim 14, where the second data rate includes a data rate for the use by the first user equipment and another data rate for use by the second user equipment.

16. The method of claim 14, where the first user equipment conducts a first call via the modified single bearer while the second user equipment conducts a second call via the modified single bearer.

17. The method of claim 16, further comprising:
receiving a request to drop one of the first call or the second call; and
providing a drop call request to the network device based on the request to drop one of the first call or the second call,
  where the network device reestablishes, based on the drop call request, the single bearer with the LTE device at the first data rate.

18. A device, comprising:
a processor to:
  receive a first call request from a first user equipment associated with a long term evolution (LTE) device, wherein the LTE device is one of a WiFi access point or a fixed wireless customer premises equipment (CPE),
  provide a first establish bearer request to a network device associated with a wireless network,
    where the first establish bearer request includes first credentials associated with the first user equipment, and
    where the network device establishes, based on the first establish bearer request, a single bearer with the LTE device at a first data rate,
  receive a second call request from a second user equipment associated with the LTE device, and
  provide a second establish bearer request to the network device,
    where the second establish bearer request includes second credentials associated with the second user equipment,
    where the network device modifies, based on the second establish bearer request, the single bearer with the LTE device to a second data rate, and
    where the second data rate includes a data rate for the use by the first user equipment and another data rate for use by the second user equipment.

19. The device of claim 18, where the first user equipment conducts a first call via the modified single bearer at the same time the second user equipment conducts a second call via the modified bearer.

20. The device of claim 19, where the processor is further to:
  receive a request to drop one of the first call or the second call, and
  provide a drop call request to the network device based on the request to drop one of the first call or the second call,
    where the network device reestablishes, based on the drop call request, the single bearer with the LTE device at the first data rate.

* * * * *